United States Patent [19]
Kapanka et al.

[11] Patent Number: 5,520,349
[45] Date of Patent: May 28, 1996

[54] ADJUSTABLE AUTOMATIC LOCKING RETRACTOR

[75] Inventors: Harley L. Kapanka, Auburn Hills; Michael K. Hishon, New Baltimore, both of Mich.

[73] Assignee: TRW Vehicle Safety Systems Inc., Lyndhurst, Ohio

[21] Appl. No.: 410,126

[22] Filed: Mar. 23, 1995

[51] Int. Cl.⁶ .................................................. B60R 22/415
[52] U.S. Cl. .................................... 242/382.2; 242/382.4
[58] Field of Search ............................ 242/382.2, 382.3, 242/382.4, 382.1; 280/806; 297/478, 480

[56] References Cited

U.S. PATENT DOCUMENTS

| | | |
|---|---|---|
| 4,585,186 | 4/1986 | Izuchi et al. . |
| 4,597,546 | 7/1986 | Yamamoto et al. . |
| 4,726,539 | 2/1988 | Schmidt et al. . |
| 5,297,752 | 3/1994 | Brown et al. . |
| 5,328,120 | 7/1994 | Schmid ................................. 242/382.4 |

*Primary Examiner*—John M. Jillions
*Attorney, Agent, or Firm*—Tarolli, Sundheim, Covell, Tummino & Szabo

[57] ABSTRACT

A seat belt retractor (10) includes a spool (14) on which a seat belt (16) is wound. Ratchet wheels (22) are fixed for rotation with the spool (14). A pawl (30) is movable into a blocking position for blocking rotation of the ratchet wheels (22) and the spool (14) in a belt withdrawal direction (A). A lever (50) is pivotable to move the pawl (30) to the blocking position after a predetermined length of the seat belt (16) is withdrawn from the spool 14. A control ring gear assembly (94) causes the lever (50) to pivot. The control ring gear assembly (94) includes two members (96 and 108), which have projections (104, 116), respectively, for engaging and pivoting the lever (50). The member (108) is movable relative to the member (96) for changing the amount of rotation of the ring gear assembly (94) required prior to the projection (116) moving the lever (50) to cause a lock-up of the retractor. This, in turn, changes the predetermined length of the seat belt (16) which must be withdrawn to cause the retractor to lock up.

23 Claims, 4 Drawing Sheets

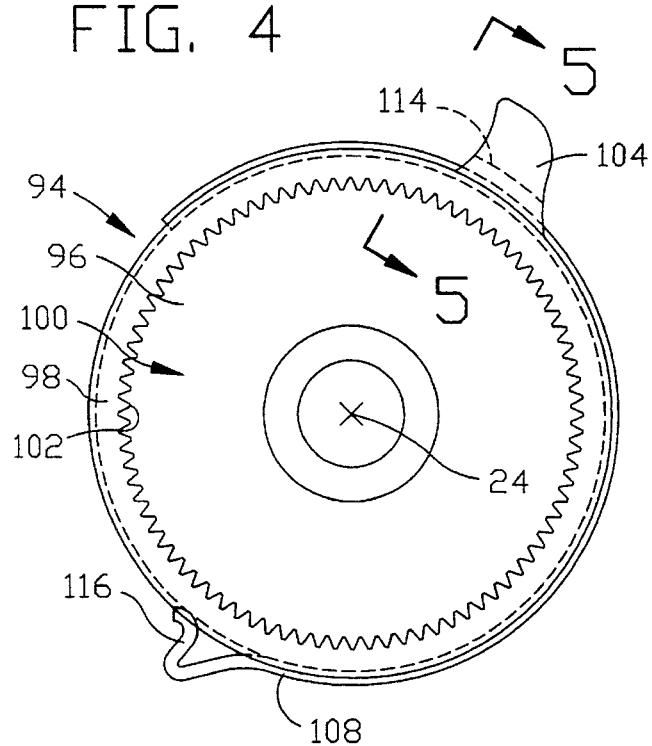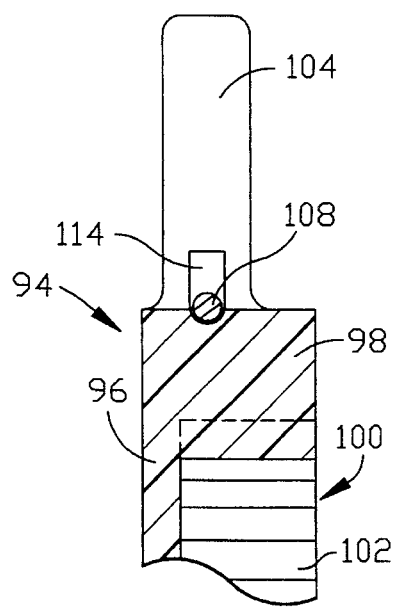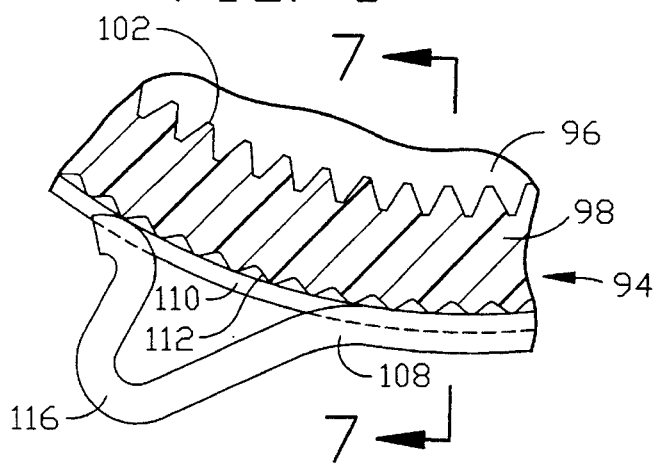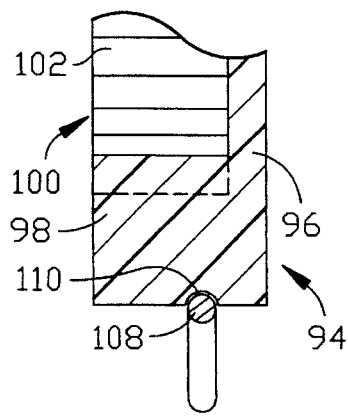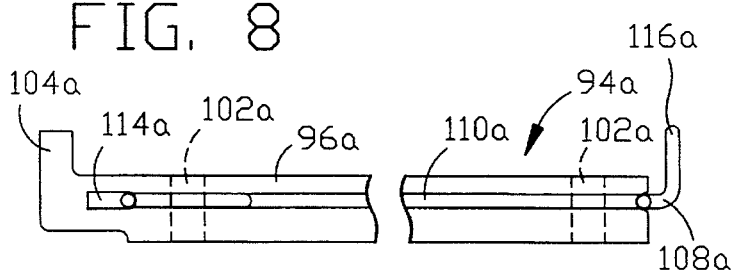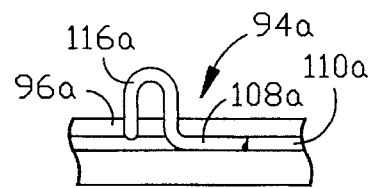

ADJUSTABLE AUTOMATIC LOCKING RETRACTOR

BACKGROUND OF THE INVENTION

The present invention relates to a vehicle seat belt retractor, and more specifically to a seat belt retractor having a locking pawl which is moved into engagement with a ratchet wheel to block rotation of a seat belt storage spool in a seat belt withdrawal direction in response to withdrawal of a predetermined amount of the seat belt from the spool.

A known retractor having a locking pawl which is moved into engagement with a ratchet wheel to block rotation of a seat belt storage spool in a seat belt withdrawal direction in response to withdrawal of a predetermined amount of a seat belt from the spool is disclosed in U.S. Pat. No. 4,726,539. The retractor disclosed in this patent has a ring gear which is rotated during withdrawal of the seat belt. A pair of tabs are formed on the outside of the ring gear. Upon extension of a predetermined amount of the seat belt, one of the tabs engages an arm on a mode switching lever to pivot the switching lever. Pivotal movement of the switching lever actuates an overcenter spring to move a locking pawl into engagement with a ratchet wheel to block rotation of the spool in a seat belt withdrawal direction. Upon retraction of almost the entire length of the seat belt back onto the spool, a second arm on the switching lever is engaged by the other tab to pivot the switching lever. The overcenter spring is then actuated by the switching lever to move the locking pawl out of engagement with the ratchet wheel.

SUMMARY OF THE INVENTION

The present invention relates to a seat belt retractor which has a locking pawl which is automatically engaged against a ratchet wheel to block seat belt withdrawal from a seat belt storage spool in response to withdrawal of a predetermined amount of seat belt from the spool. Specifically, the present invention is a seat belt retractor which is adjustable to change the amount of seat belt which can be withdrawn from the spool prior to automatic blocking of withdrawal of seat belt from the spool.

The spool is rotatable about an axis in belt withdrawal and belt retraction directions. The ratchet wheel is fixedly connected with the spool and is rotatable with the spool. The locking pawl has a blocking position for blocking the ratchet wheel and the spool against rotation in the belt withdrawal direction. Also, the locking pawl has a release position for permitting rotation of the ratchet wheel and the spool in the belt withdrawal direction.

A lock means automatically moves the locking pawl between the release position and the blocking position. The lock means includes a movable control means movable through a range of movement as the seat belt is withdrawn from the spool. A predetermined amount of movement of the control means causes movement of the locking pawl to the blocking position. A drive means moves the control means upon rotation of the spool. The control means includes adjustment means for changing the amount of movement through which the control means must travel to cause movement of the locking pawl to the blocking position. This varies the length of the seat belt which is withdrawn from the spool prior to movement of the locking pawl to the blocking position.

Preferably, the control means includes first and second actuator means supported on a movable member. The drive means moves the movable member upon rotation of the spool. The first actuator means is movable with the movable member for causing movement of the locking pawl to the blocking position upon withdrawal of a predetermined length of the seat belt from the spool. The first actuator means is adjustable relative to the movable member for changing the predetermined length of the seat belt.

The second actuator means is movable with the movable member for causing movement of the locking pawl to the release position during retraction of the predetermined length of the seat belt onto the spool. The first actuator means is moved relative to the second actuator means during adjustment of the first actuator means.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is an illustration of parts of the retractor of FIG. 1;

FIG. 5 is an enlarged sectional view taken along line 5—5 in FIG. 4;

FIG. 6 is an enlarged fragmentary view partially in section of a portion of the parts shown in FIG. 4;

FIG. 7 is a sectional view taken along line 7—7 of FIG. 6;

FIG. 8 is a fragmentary schematic view of certain parts of a second embodiment of the present invention; and FIG. 9 is a fragmentary schematic view of the parts shown in FIG. 8 from another perspective.

DESCRIPTION OF PREFERRED EMBODIMENT

Figure 1:
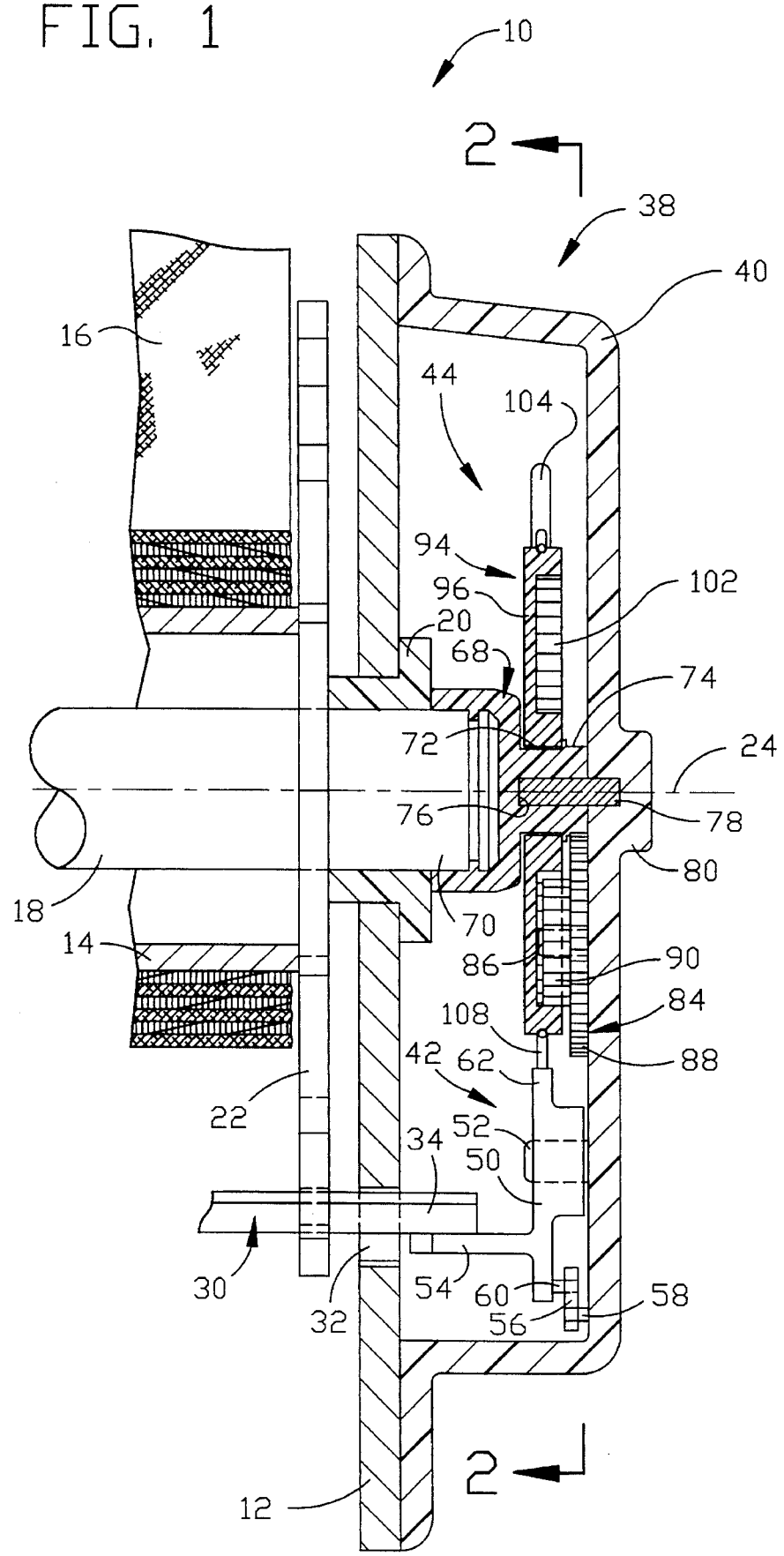
FIG. 1 is a partially broken away, longitudinal sectional view of a seat belt retractor embodying the present invention.

The present invention relates to a vehicle seat belt retractor. The seat belt retractor may be of many different constructions. As representative of the present invention, a vehicle seat belt retractor 10 is illustrated in FIG. 1.

The seat belt retractor 10 includes a metal frame 12, which is adapted to be fixed to a vehicle, and a seat belt storage spool 14, which is rotatable about an axis 24 relative to the frame 12. The spool 14 is fixed to and supported for rotation by a cylindrical shaft 18. The shaft is rotatably supported at its ends by bearings 20 (only one shown in FIG. 1) mounted in the frame 12. Two metal toothed locking ratchet wheels 22 (only one shown) are also fixed to the spool 14 at its opposite ends. Thus, the spool 14, the shaft 18, and the ratchet wheels 22 rotate as a unit relative to the frame 12 about the axis 24.

A length of seat belt 16 is wound on the spool 14. An end of the seat belt 16 is attached to the spool 14, in a known manner. The spool 14 is rotatable in a seat belt withdrawal (unwinding) direction A (FIG. 2) and a seat belt retraction (winding) direction B. A rewind spring (not shown) acts between the frame 12 and an end of the shaft 18 to bias the shaft 18 to rotate in the seat belt retraction direction B, as is known.

A metal locking pawl or bar 30 (FIG. 1) is pivotably supported in openings 32 (only one shown) formed in the frame 12. The pawl 30 has portions which are adjacent to the ratchet wheels 22 and which are movable into engagement with the ratchet wheels 22 upon pivoting of the pawl 30 to a blocking position (shown in FIG. 2) from a release position (shown in FIG. 3). In the blocking position (FIG. 2), the pawl 30 blocks rotation of the ratchet wheels 22 and the spool 14 in the seat belt withdrawal direction A. An emergency lock-up mechanism (not shown), such as an inertia mass sensor assembly, causes the pawl 30 to pivot to the blocking position upon the occurrence of vehicle deceleration above a predetermined deceleration, as is known.

Figure 2:
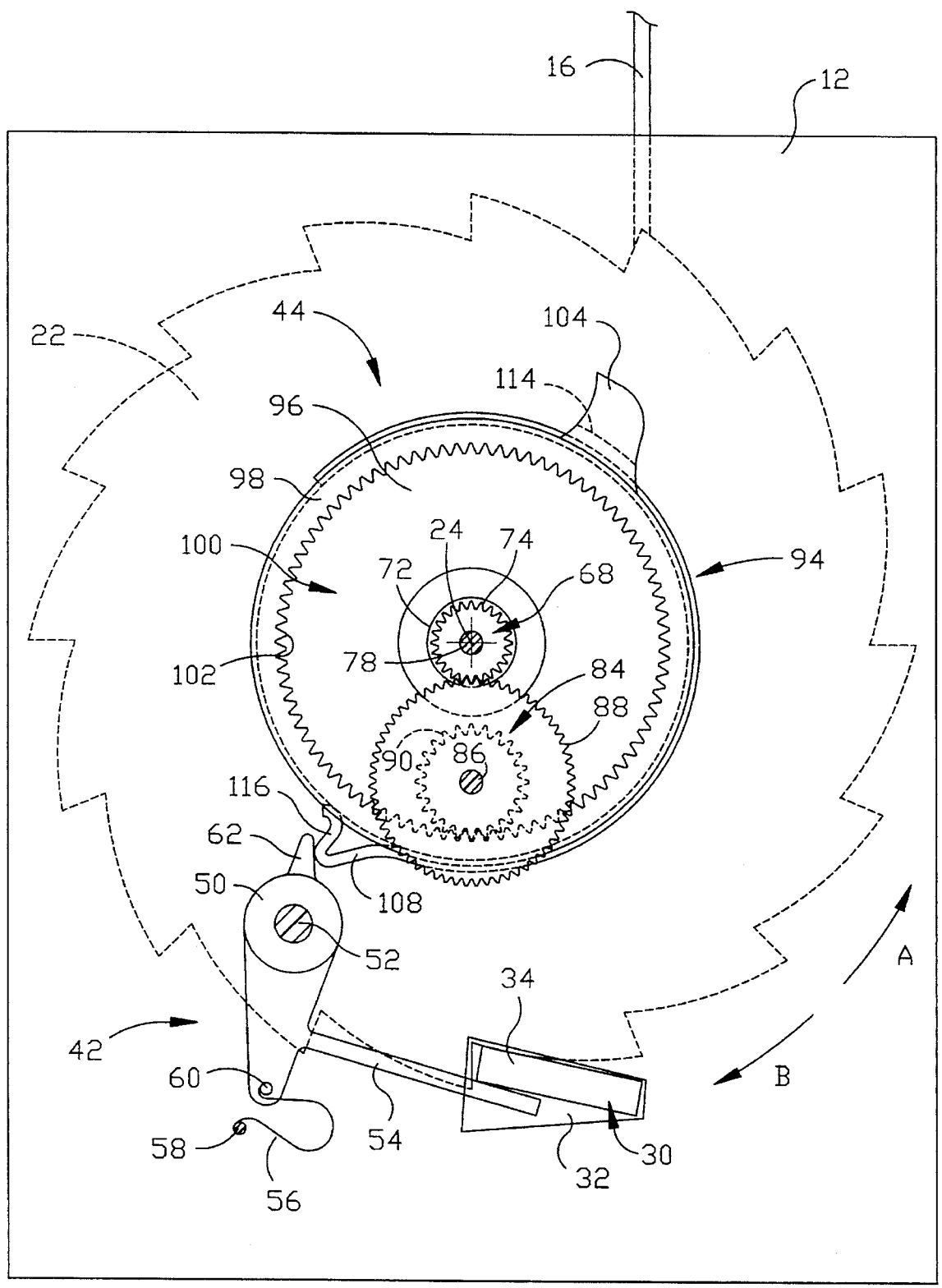
FIGS. 2 is a view taken along line 2—2 of FIG. 1 with certain parts removed for clarity and showing certain parts in a first operational position.

A lock-up actuator assembly 38 (FIG. 1) also causes the pawl 30 to pivot to its blocking position shown in FIG. 2. However, this pivoting is automatic upon withdrawal of an amount of the seat belt 16 sufficient to extend across a vehicle occupant or article in order to provide for a positive securing of the seat belt 16.

The actuator assembly 38 includes a protective plastic support housing 40 fixed to one side of the frame 12. The housing 40 encloses a lever system 42 and a gear system 44, both of which comprise parts of the actuator assembly 38. The lever system 42 interacts with an extension portion 34 of the pawl 30 to pivot the pawl 30. The gear system 44 controls the lever system 42 upon rotation of the spool 14.

The lever system 42 includes a plastic lever 50 which is pivotably supported on a projection 52 on the cover 40. The lever 50 has a nose 62 which extends toward the gear system 44. Am arm 54 of the lever 50 extends below the extension portion 34 of the pawl 30. Upon pivoting of the lever 50 from a first position (shown in FIG. 3) to a second position (shown in FIG. 2), the arm 54 pivots and lifts the pawl 30 to its blocking position (FIG. 2) to engage and block rotation of the ratchet wheels 22 in the belt withdrawal direction A. Thus, the lever 50 is a part for moving the pawl 30 to its blocking position.

A metal overcenter spring 56 of the lever system 42 extends between a projection 58 on the cover 40 and a projection 60 on the lever 50. The overcenter spring 56 is stressed to provide a force which biases the projections 58 and 60 relatively away from each other. When the lever 50 is moved between its first and second positions, the projection 60 is moved through a short arc which varies the distance between the projection 58 and the projection 60. The smallest distance between the projections 58 and 60 along this arc is at a transition position (not shown) of the lever 50. The stress in the overcenter spring 56 increases during the movement from the first position to the transition position and the stress decreases during the movement from the transition position to the second position.

Thus, during pivoting of the lever 50 from its first position to its second position, the overcenter spring 56 biases the lever 50 toward its first position until the transition position is reached. Once the transition position is reached, the overcenter spring 56 biases the lever 50 toward its second position. Further, the stress in the overcenter spring 56 causes the lever 50 to snap to its second position. Upon pivoting of the lever 50 from its second position to its first position, the overcenter spring 56 provides a similar change of bias at the transition position. Thus, the overcenter spring 56 provides a force which holds the lever 50 in either its first or second position until the lever 50 is moved against the bias of the overcenter spring 56.

The gear system 44 includes a plastic central gear member 68 which is interlocked onto an extension end 70 (FIG. 1) of the shaft 18, such that the central gear member 68 is rotated with the spool 14. The central gear member 68 has a smooth external bearing hub surface 72 located adjacent the shaft 18, an external array of gear teeth 74 located axially farther from the shaft 18 than the bearing hub surface 72, and a smooth axial recess 76 formed in the distal end of the central gear member. A smooth support pin 78 fits in and extends from the recess 76 to a boss 80 on the cover 40 to support and align the central gear member 68 for rotation about the axis 24. The pin 78 may be fixed to either the central gear member 68 or the cover 40, or the pin 78 may be free floating.

A plastic intermediate gear member 84 (FIG. 2) is rotatably mounted on a projection 86 on the cover 40. The intermediate gear member 84 has a large diameter array of external gear teeth 88 and a small diameter array of external gear teeth 90 which are coaxial on an axis offset from the axis 24. The large and small diameter arrays of gear teeth 88 and 90 are fixed relative to each other, and in the preferred embodiment are molded together as one piece. The large diameter array of gear teeth 88 intermeshes with the array of gear teeth 74 on the central gear member 68. Thus, as the spool 14 is rotated, the intermediate gear member 84 is rotated, but in the opposite direction.

A control ring gear assembly 94 includes a plastic ring gear 96 which is rotatably supported on the hub surface 72 (FIG. 1) of the control gear member 68 such that the control ring gear assembly 94 can rotate about the axis 24 relative to the central gear member 68. At its radially outer periphery, the ring gear 96 has an axially projecting, annular rim 98 (FIG. 4). Formed on the radially inner circumference of the rim 98 is a circular array of internal gear teeth 102. The rim 98 also defines an annular space 100 into which the small diameter array of gear teeth 90 (FIG. 1) of the intermediate gear member 84 extends. The gear teeth 90 mesh with the internal gear teeth 102 of the ring gear 96 such that the control ring gear assembly 94 is rotated upon rotation of the intermediate gear member 84. The central gear member 68 and the intermediate gear member 84 provide a drive connection between the control ring gear assembly 94 and the rotational unit of the spool 14, the shaft 18 and ratchet wheels 22.

A projection 104 (FIGS. 4 and 5) extends radially outward from the rim 98 of the ring gear 96. The projection 104 is fixed to the ring portion 98 and, in the preferred embodiment, is formed in one piece with the ring gear 96. During rotation of the control ring gear assembly 94, the projection 104 is moved about the axis 24 toward or away from the lever 50.

A wire member 108 extends approximately two hundred and seventy degrees (270°) around the outer circumference of the rim 98 of the ring gear 96. The wire member 108 is a part of the control ring gear assembly 94. The wire member 108 is made of stainless spring steel. Prior to assembly on the rim 98, the wire member 108 has a diameter less than the diameter of the rim 98. Thus, when the wire member 108 is assembled on the rim 98, the wire member 108 squeezes against and grips the rim 98.

The gripping force of the wire member 108 against the rim 98 provides a resistance against relative movement between the rim 98 and the wire member 108. In particular, sliding of the wire member 108 around the outer circumference of the rim 98 is inhibited. This resistance can be overcome, however, if a sufficient amount of external force is applied to the wire member 108, and the wire member 108 will then slide around the outer circumference of the rim 98.

In a preferred embodiment, the rim 98 has a circumferential groove 110 (FIGS. 6 and 7) for receiving the wire member 108 and for aiding in aligning and retaining the wire member 108 on the ring gear 96. Also in the preferred embodiment, serrations 112 (FIG. 6) are formed on the rim 98 in the groove 110. The serrations 112 provide for increased frictional resistance against sliding of the wire member 108 around the rim 98. Further in the preferred embodiment, the projection 104 (FIG. 5) has a bore 114 through which the wire member 108 extends.

The wire member 108 (FIG. 4) has a bent portion which defines a projection or dog 116. The projection 116 extends radially away from the ring portion 98 and is fixed relative to the wire member 108 itself. The projection 116 moves about the axis 24 relative to the ring gear 96 when the wire member 108 moves about the ring gear 96 in response to an external force being applied to the wire member 108. During such relative movement, the projection 116 moves relative to the projection 104 and the array of gear teeth 102 about the outer periphery of the rim 98.

Figure 3:
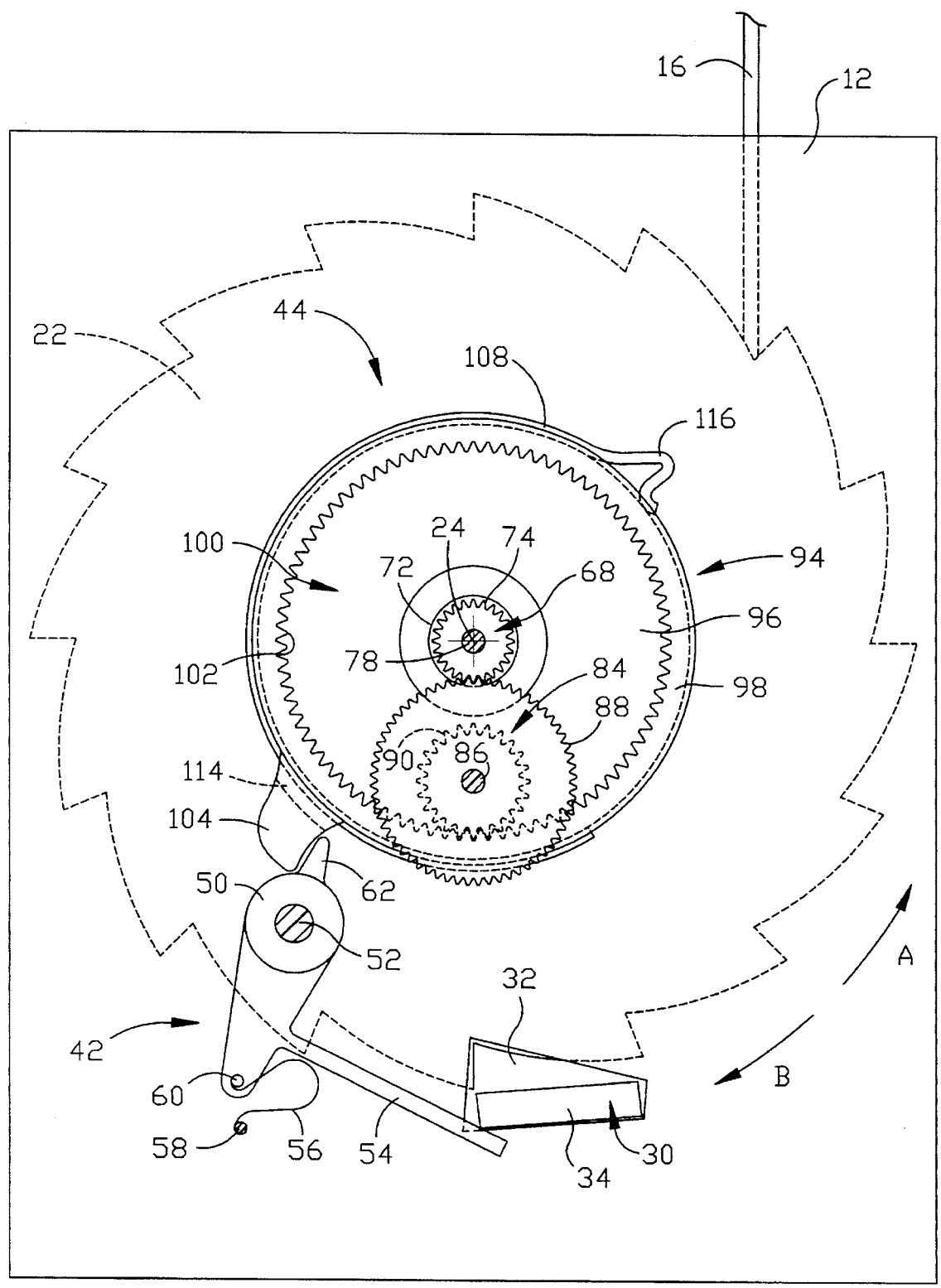
FIG. 3 is a view similar to FIG. 2 with certain parts shown in a second operational position.

When most of the seat belt 16 is retracted and wound onto the spool 14, the parts are in the position shown in FIG. 3, and the control ring gear assembly 94 is in a position near a starting rotational position. During withdrawal of the seat belt 16, the central gear member 68 rotates (counterclockwise, as viewed in FIGS. 2 and 3), the intermediate gear member 84 rotates in the opposite direction (clockwise), and the control ring gear assembly 94 also rotates in the direction (clockwise) opposite to that of the central gear member 68. The gearing ratios of the central gear member 68, the intermediate gear member 84 and the ring gear 96 are such that when a predetermined sufficient amount of the seat belt 16 is withdrawn to extend across an occupant or object located in an associated vehicle seat, the control ring gear assembly 94 is rotated, as a unit, from its starting rotational position to an ending rotational position (FIG. 2). The rotational range through which the control ring gear assembly 94 moves is less than one revolution. The wire member 108 and the ring gear 96 rotate together as the unit which defines the control ring gear assembly 94 because of the frictional engagement of the wire member 108 on the ring gear 96.

The projection 116 is located on the control ring gear assembly 94 such that the projection 116 is moved about the axis 24 to engage the nose 62 and move the lever 50 toward its second position (FIG. 2) against the bias of the overcenter spring 56 when a sufficient amount of the seat belt 116 is withdrawn and the control ring gear assembly 94 is in its ending rotational position. In the preferred embodiment, this amount of seat belt 16 is predetermined to be most of the available length of the seat belt 16 and is associated with a rotational range of travel of the spool 14 of several revolutions. Once the transition position of the lever 50 is reached, the lever 50 snaps to its second position under the bias of the overcenter spring 56.

With the lever 50 in its second position, the pawl 30 is in its blocking position and blocks further withdrawal of the seat belt 16. The seat belt 16 may be wound back into the retractor 10 due to the sloped teeth on the ratchet wheels 22 which cam the pawl 30 radially outward as each tooth passes by the pawl 30 during rotation of the spool 14 and ratchet wheels 22 in the seat belt retraction direction B. This permits slack to be taken up from the fastened seat belt 16 and yet a new locking position can be established at each tooth. Also, this permits complete retraction of the seat belt 16 when unfastened.

During retraction of the seat belt 16, the central gear member 68 is rotated (as viewed in FIGS. 2 and 3) clockwise, the intermediate gear member 84 is rotated counterclockwise and the control ring gear assembly 94 is rotated counterclockwise. As the seat belt 16 approaches a completely retracted position, the projection 104 engages the nose 62 and moves the lever 50 toward its first position (FIG. 3) against the bias of the overcenter spring 56. Once the transition position of the lever 50 is reached, the lever snaps to its first position under the bias of the overcenter spring 56. The pawl 30 can then drop away from the ratchet wheels 22 under the influence of the gravity to its release position, and the retractor 10 is reset to permit a subsequent withdrawal of the seat belt 16.

The length of the seat belt 16 which is needed for proper extension across an occupant or article varies for various types and styles of vehicles. The length is dependent upon such factors as vehicle size and interior component placement. The present invention permits a single retractor design which can be adjusted to accommodate the various lengths of the seat belt 16 which are to be withdrawn from a retractor 10 when used in different vehicles prior to the occurrence of the automatic locking of the retractor 10 (FIG. 1) by the actuator assembly 38.

Adjustment of the amount of the seat belt 16 that is withdrawn prior to automatic locking of the retractor 10 by the actuator assembly 38 is accomplished by moving the wire member 108 (FIG. 4), and its projection 116, relative to the ring gear 96 prior to final assembly of the retractor 10. The application of sufficient force, either manually or by a tool, to the wire member 108 causes the wire member 108 to slide along the groove 110 of the ring gear 96. This adjustment can be performed before or after the rest of the gear system 44 is assembled.

Repositioning the projection 116 relative to the ring gear 96 causes a change in the respective amounts of rotation of the control ring assembly 94 and the spool 14 which are permitted before the lever 50 is moved. An increase in the amount of permitted rotation of the control ring assembly 94 increases the amount of permitted rotation of the spool 14 and increases the predetermined length of the seat belt 16 which is withdrawn prior to automatic lock-up. A decrease in the amount of permitted rotation of the control ring assembly 94 results in an associated decrease in the amount of permitted rotation of the spool 14 and a decrease in the predetermined length of the seat belt 16.

In another embodiment of the invention (FIGS. 8 and 9, in which similar structure is identified by a similar reference numeral with an "a" suffix), the actuator assembly 38 (FIG. 1) is slightly modified. In the control ring gear assembly 94 of the second embodiment, the projection 104a and the projection 116a extend generally parallel to each other and axially from the ring gear 96a, rather than radially. The projections 104a and 116a are engageable with a lever (not shown) located at a position axially offset and adjacent to the control ring assembly 94a. The control ring assembly 94a is rotated in a manner identical to the control ring assembly 94 of the first embodiment such that the projections 116a and 104a are moved to activate and reset the automatic lock-up of the retractor in a manner identical to the operation of the first embodiment. Moreover, the wire 108a is movable relative to the ring gear 96a to vary the rotational range of travel of the control ring gear assembly 94a and the length of the seat belt in a manner identical to the operation of the first embodiment. Thus, the second embodiment can also be used in a variety of types and styles of vehicles in which different lengths of seat belt are needed prior to automatic lock-up.

From the above description of the invention, those skilled in the art will perceive improvements, changes and modifications. For example, an additional or an alternative means for preventing sliding motion of the wire member 108 around the outer circumference of the portion 98, such as a fastener, could be used. Such improvements, changes and modifications within the skill of the art are intended to be covered by the appended claims.

Having described the invention, the following is claimed:

1. A seat belt retractor comprising:

spool means for storing a seat belt wound on said spool means, said spool means being rotatable about an axis in belt withdrawal and belt retraction directions;

a ratchet wheel fixed for rotation with said spool means;

movable pawl means having a blocking position for blocking said ratchet wheel and said spool means against rotation in the belt withdrawal direction and a release position for permitting rotation of said ratchet wheel and said spool means in the belt withdrawal direction; and lock means for automatically moving said pawl means between the release position and the blocking position, said lock means including a movable member and drive means for moving said movable member upon rotation of said spool means, said lock means further including an actuator means supported on said movable member, said actuator means being movable with said movable member for causing movement of said pawl means to the blocking position upon withdrawal of a predetermined length of the seat belt from said spool means, and said lock means also including means for enabling adjustment of said actuator means relative to said movable member so that said actuator means is adjustable for changing the predetermined length of the seat belt.

2. A seat belt retractor as set forth in claim 1, wherein said actuator means includes a projecting part which extends from said movable member.

3. A seat belt retractor as set forth in claim 2, wherein said lock means includes mover means for moving said pawl means from the release position to the blocking position in response to said projecting part engaging said mover means.

4. A seat belt retractor as set forth in claim 1, wherein said movable member has a portion with a first gear tooth array, said drive means includes a second gear tooth array meshed with said first tooth array for moving said movable member and said actuator means through an amount of movement during an amount of rotation of said spool means and said ratchet wheel, said means for enabling adjustment includes means for enabling movement of said actuator means relative to said first gear tooth array and said second gear tooth array without movement of said first gear tooth array relative to said second tooth array.

5. A seat belt retractor as set forth in claim 1, wherein said actuator means is a first actuator means, and said lock means includes second actuator means movable with said movable member for causing movement of said pawl means to the release position during retraction of the predetermined length of the seat belt onto the spool means.

6. A seat belt retractor as set forth in claim 5, wherein said second actuator means is fixed relative to said movable member.

7. A seat belt retractor as set forth in claim 6, wherein said movable member comprises a rotatable ring gear, said first actuator means includes a resilient member extending about a segment of said ring gear and resiliently biased into engagement with said ring gear, said first actuator means being a projecting part of said resilient member, said second actuator means being a projecting part of said ring gear, and said lock means includes a mover means engageable by said projecting part of said resilient member and said projecting part of said ring gear for moving said pawl means between the release position and the blocking position.

8. A seat belt retractor comprising:

spool means for storing a seat belt wound on said spool means, said spool means being rotatable about an axis in belt withdrawal and belt retraction directions;

a ratchet wheel fixed for rotation with said spool means;

movable pawl means having a blocking position for blocking said ratchet wheel and said spool means against rotation in the belt withdrawal direction and a release position for permitting rotation of said ratchet wheel and said spool means in the belt withdrawal direction; and lock means for automatically moving said pawl means between the release position and the blocking position, said lock means including a movable member and drive means for moving said movable member upon rotation of said spool means, said lock means further including first and second actuator means supported on said movable member, said first actuator means being movable with said movable member for causing movement of said pawl means to the blocking position upon withdrawal of a predetermined length of the seat belt from said spool means, said second actuator means being movable with said movable member for causing movement of said pawl means to the release position during retraction of the predetermined length of the seat belt onto said spool means, and said lock means also including means for enabling movement of said first actuator means relative to said second actuator means for changing the predetermined length of seat belt.

9. A seat belt retractor as set forth in claim 8, wherein said lock means includes mover means for engaging and moving said pawl means to the blocking position and for permitting said pawl means to move to the release position, said first and second actuator means including first and second projections, respectively, for engaging said mover means.

10. A seat belt retractor as set forth in claim 9, wherein said first actuator means includes an actuator member mounted on said movable member, said first projection being a part of said actuator member, said actuator member being movable with said movable member for causing movement of said pawl means to the blocking position and said actuator member being movable relative to said movable member for changing the predetermined length of the seat belt.

11. A seat belt retractor as set forth in claim 10, wherein said actuator member is resilient and is resiliently biased into engagement with said movable member, the resilient bias of said actuator member providing means for preventing relative movement between said movable member and said actuator member prior to application of a sufficient external force.

12. A seat belt retractor as set forth in claim 10, wherein said actuator member comprises a wire which extends about a portion of said movable member.

13. A seat belt retractor as set forth in claim 9, wherein said movable member includes a portion having a first gear tooth array, said drive means includes a second gear tooth array meshed with said first gear tooth array, said second actuator means being fixed on said movable member and being fixed relative to said first gear tooth array, said first actuator means being movable with said movable member and said first gear tooth array, and said means for enabling movement of said first actuator means relative to said second actuator means includes means enabling movement of said first actuator means relative to said first gear tooth array.

14. A seat belt retractor comprising:

spool means for storing a seat belt wound on said spool means, said spool means being rotatable about an axis in belt withdrawal and belt retraction directions;

a ratchet wheel fixed for rotation with said spool means;

movable pawl means having a blocking position for blocking said ratchet wheel and said spool means against rotation in the belt withdrawal direction and a release position for permitting rotation of said ratchet wheel and said spool means in the belt withdrawal direction; and lock means for automatically moving said pawl means between the release position and the blocking position, said lock means including movable control means for travelling through a range of movement as the seat belt is withdrawn from said spool means and for causing movement of said pawl means to the blocking position at one end of the range of movement, said lock means further including drive means engaged between said spool means and said control means for moving said control means upon rotation of said spool means, said control means including adjustment means for changing the length of the range of movement through which said control means must travel to cause movement of said pawl means to the blocking position and thereby changing the length of the seat belt which is withdrawn from said spool means prior to movement of said pawl means to the blocking position;

said control means including a movable member which is moved by said drive means, said control means also including actuator means movable with said movable member for causing movement of said pawl means to the blocking position, said adjustment means including means for enabling movement of said actuator means relative to said movable member, said actuator means including a resilient part resiliently biased into engagement with said movable member and comprising means for preventing relative movement between said actuator means and said movable member prior to application of an external force to said actuator means, and said means for permitting movement of said actuator means relative to said movable member including surface means on said resilient member and said movable member for permitting said resilient member to slide along said movable member in response to application of the sufficient external force.

15. A seat belt retractor as set forth in claim 14, wherein said resilient member comprising a wire having a bent portion defining a projection, said wire extending about a portion of said movable member.

16. A seat belt retractor as set forth in claim 14, wherein said surface means includes a contoured portion for resisting relative movement between said resilient member and said movable member.

17. A seat belt retractor comprising:

spool means for storing a seat belt wound on said spool means, said spool means being rotatable about an axis in belt withdrawal and belt retraction directions;

a ratchet wheel fixed for rotation with said spool means;

movable pawl means having a blocking position for blocking said ratchet wheel and said spool means against rotation in the belt withdrawal direction and a release position for permitting rotation of said ratchet wheel and said spool means in the belt withdrawal direction; and lock means for automatically moving said pawl means between the release position and the blocking position, said lock means including movable control means for travelling through a range of movement as the seat belt is withdrawn from said spool means and for causing movement of said pawl means to the blocking position at one end of the range of movement, said lock means further including drive means engaged between said spool means and said control means for moving said control means upon rotation of said spool means, said control means also including adjustment means for adjusting the length of the range of movement through which said control means must travel to cause movement of said pawl means to the blocking position and thereby changing the length of the seat belt which is withdrawn from said spool means prior to movement of said pawl means to the blocking position.

18. A seat belt retractor as set forth in claim 17, wherein said control means includes a movable member which is moved by said drive means, said control means also includes actuator means movable with said movable member for causing movement of said pawl means to the blocking position, and said adjustment means includes means for enabling movement of said actuator means relative to said movable member.

19. A seat belt retractor as set forth in claim 18, wherein said lock means includes mover means movable by said actuator means for moving said pawl means.

20. A seat belt retractor as set forth in claim 19, wherein said actuator means includes a projecting part which extends from said movable member, and said mover means includes a lever movable to move said pawl means, said projecting part engaging and moving said lever upon movement of said control means to the one end of the range of movement.

21. A seat belt retractor as set forth in claim 17, wherein said movable member has a portion with a gear tooth array, and said drive means includes a second gear tooth array meshed with said first gear tooth array, said actuator means being movable relative to said first gear tooth array.

22. A seat belt retractor as set forth in claim 17, wherein said actuator means is a first actuator means, and said control means includes second actuator means for causing movement of said pawl means to the release position.

23. A seat belt retractor as set forth in claim 22, wherein said lock means includes mover means for moving said pawl means to the blocking position and for permitting movement of said pawl means to the release position, said first and second actuator means includes first and second projecting parts, respectively, for moving said mover means.

* * * * *